Jan. 21, 1930.  W. DUBILIER  1,744,301
GRID LEAK AND CONDENSER
Filed Oct. 31, 1925
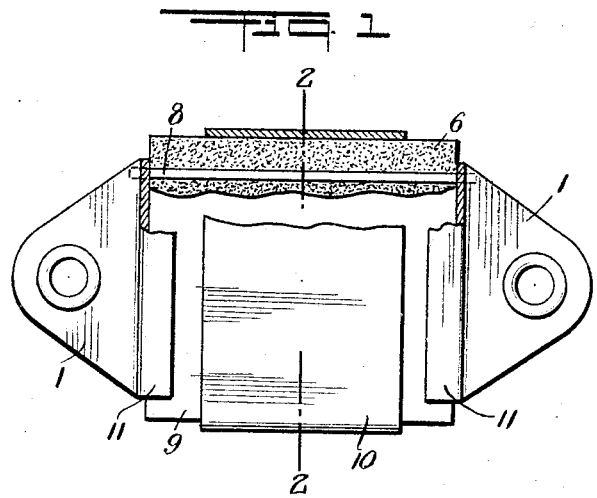
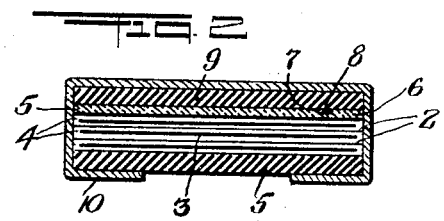
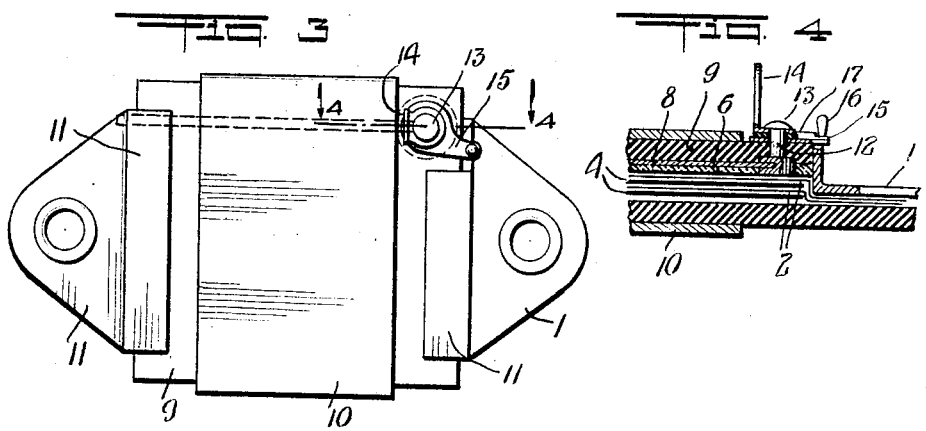
INVENTOR
WILLIAM DUBILIER
BY
Van Deventer & Nickel
ATTORNEYS Patented Jan. 21, 1930

1,744,301

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

GRID LEAK AND CONDENSER

Application filed October 31, 1925. Serial No. 66,097.

This invention relates to grid leaks and condensers and the like; such as are used in the electrical circuits of radio apparatus; and especially to a condenser having a resistance element incorporated with it.

An object of the invention is to provide a grid leak and condenser in which the parts are held in secure combination, and enable the grid leak to have efficient connection with the terminals to which it is to be affixed.

A further object of my invention is to provide in such a combination suitable means for holding the parts firmly in operative relation and protecting them against damage.

With these and such other objects in view as may hereinafter appear, my invention consists in the parts and combinations of parts, hereinafter described and recited in the claims; with the understanding that the several necessary members and elements of my preferred constructions may be varied in dimensions, form and arrangement without departing from the spirit and scope of the invention or altering the principle thereof.

To make my invention clear, I have shown in the accompanying drawings forming a part of this specification, means for practicing the invention without limiting the improvements to the precise structural details illustrated herein for purposes of explanation.

On the drawings Figure 1 is a top plan of my improved grid leak and condenser with a portion shown as if broken away. Figure 2 is a sectional view along the line 2—2 of Figure 1; Figure 3 is a top plan of a modification and Figure 4 is a sectional view on the line 4—4 of Figure 3. The same numerals identify the same parts throughout. Heretofore resistances for use with condensers connected to the grids of three-electrode vacuum tubes, which resistances are, in effect, shunts for the direct current component of the grid current, have been made as separate units. Often such resistances are mounted upon the condenser and put in parallel with it by means of special supports or clips attached to the terminals of the condenser. These methods of connection however, permit the condenser and grid leak to be affected by vibration, corrosion, and other disturbing influences; and experience demonstrates that the incorporation of the resistor or grid leak with the condenser is much more desirable. Obviously an externally located grid leak is more subject to the effects of atmospheric humidity than a resistance element enclosed in the body of a condenser. In my invention advantage of uniformity of resistance is thus secured. In Figure 1, the numerals 1 indicate perforated metallic clamps constituting terminals in electrical contact with the conductive elements 2 of the body or stack of the condenser indicated as a whole at 3. This stack is made as usual of thin plates of mica 4, or other suitable dielectric, placed between the conductive elements 2, which may be sheets of tin foil of slightly smaller area than the mica, and with the ends of the sheet 2 projecting slightly, some at one end of the stack and some at the other. On the lower face of the stack 3 a relatively thick rigid cover plate 5 of suitable insulating material, for instance, of bakelite is laid. Upon the other flat face of the stack, a thin plate 6 of suitable elastic and insulating material, such as vacuum dried cork, is placed. The upper surface of this cork plate 6, is provided with a slight longitudinal groove 7, to receive the thin, slightly conductive resistance element or strip or grid leak 8. A rectangular insulating compression cover plate 9, similar in thickness to plate 5, is laid on the cork plate 6, and the whole structure encircled by the metal band clamp.

The plate 5 has extended ends to which the clamps 1 are affixed by rivets, fastening the projecting ends of the elements 2 under the clamps; the edges 11 of the clamps overlapping the edges of the top plate 9, and cooperating with the band clamp 10 to secure the various parts of the entire device together and under sufficient compression. A condenser of this type without the said leak incorporated, is shown in my copending application Serial No. 692,869 filed February 14, 1924, Patent No. 1,575,045, March 2, 1926. The clamp 10 although covering the greater part of the surface area between the clamps 1, is nevertheless separated therefrom along its opposite edges by spaces of sufficient width. Resistance element 8 may be a thin strip of dried card board coated on one side with a thin slightly conductive layer of india ink or similar carbon-containing substance; or it may be a thin paper strip coated with a highly resistant, exceedingly thin metal film. The strip projects slightly beyond the ends of the stack 3, and its ends may be folded under the adjacent extremities of the clamps 1, and soldered or otherwise united thereto, along with the projecting tin foil ends, so that a good and durable contact with the clamps and the terminals of the condenser results.

In the completed unit, compressed by tightening the clamps 1 and the clamp 10, the elastic cork plate 6 thus exerts steady pressure upon the resistance strip and prevents any displacement thereof which might possibly break or impair its connection with the terminals of the condenser.

In some wireless circuits it is desirable now and then to connect the resistance element directly across the grid lead and the filament lead, instead of between the condenser terminals, as shown in Figure 1.

Figures 3 and 4 show a modification of my grid leak and condenser, in which provision is made for connecting the resistance 8 into the circuit in such a way. Here only one end of the strip 8 is joined to one terminal of the condenser by securing it under the adjacent end of one of the clamps 1 and the other end can be united to a suitable conductor. Then the overlapping edge 11 of the other clamp 1 can be partly removed to permit sufficient insulating space upon the surface of plate 9 for the location of some form of suitable isolated terminal 12 to which one end of the resistor 8 is affixed under the plate 9, the other end of the resistor 8 being connected to one of the clamps 1. In the drawing I have illustrated this terminal 12 as being in the form of a compression headed screw or rivet 13, located in a suitable perforation in plate 9 and with its outer end riveted over the perforated end of a suitable conductive clip connection 14 placed upon a short perforated conductor arm 15, rotatably mounted upon the rivet 13, and in contact therewith. At its tip, arm or switch member 15, has a knob 16 to enable the arm to be moved to engage with the cut away edge 11 of the adjacent clamp. When the arm 15 is thus turned to move it into contact with the clamp 1, the resistance 8 can thus be connected directly, if desired, across the terminals, 1, making the combination essentially the same as that illustrated in Fig. 1. Between the clip 14 and the arm 15 is an insulating washer 17. When the arm 15 is separated from the clamp 11, a conductor can be secured to the clip 14, which also is in electrical contact with the rivet 13 to allow the resistance 8 to be put in circuit otherwise than by bridging it across the condenser as above. Any other convenient manner of insulating one end of the resistance 8 and adapting this end for connection with some other part of a radio circuit, may be employed. While I have shown and described the parts embodied in a preferred and in a modified form of my invention I wish it to be understood that I do not confine myself to the precise details of construction as herein set forth; as it is apparent that many changes may be made by those skilled in the art within the broad meanings of the terms in the appended claims.

Having described my invention, what I believe to be new and desire to secure and protect by Letters Patent of the United States is:—

1. A condenser having sheets of conducting material separated by insulation, cover plates for the condenser, clamps associated with the cover plates and forming terminals for the condenser and a resistance element under one of said plates to be connected at one end with a terminal of the condenser and serve as a grid leak.

2. A condenser having sheets of conducting material separated by insulation, cover plates for the condenser, clamps associated with said plates and constituting terminals for the condenser, and a resistance element under one of said plates and having its ends in contact with the two clamps to serve as a grid leak.

3. A condenser having sheets of conducting material separated by insulation, cover plates for the condenser, clamps associated with the cover plates and forming terminals for the condenser and a conductive element under one of said plates to be connected at one end with a terminal of the condenser and serve as a grid leak, the condenser also carrying an isolated terminal to enable the other end of said element to be connected thereto, with a switch member on said terminal to make contact with the other clamp of the condenser when desired.

4. A condenser comprising conductive elements separated by insulation, cover plates for the condenser, a plate of compressive material under one cover plate, and having a groove therein, and a conductive element in said groove and thus disposed in the body of the condenser.

5. A condenser having conductive sheets separated by dielectric material, a resistance element incorporated therein and connected to the terminals thereof, and switching means for disconnecting the resistance element from one of the terminals of the condenser.

In testimony whereof I affix my signature.

WILLIAM DUBILIER.